P. J. HARMS.
ENDLESS SICKLE.
APPLICATION FILED JUNE 14, 1910.
992,656.
Patented May 16, 1911.
2 SHEETS—SHEET 2.
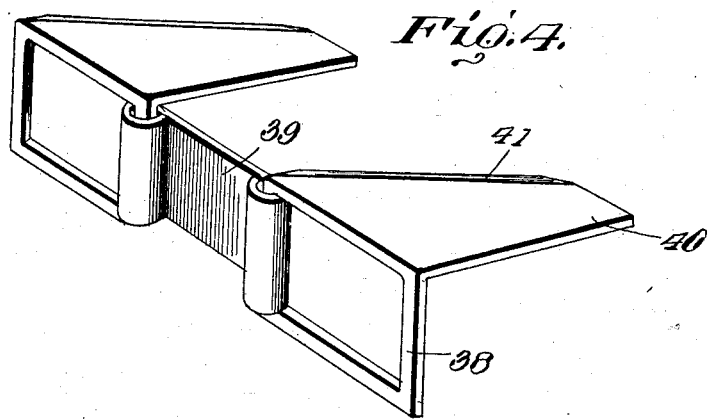
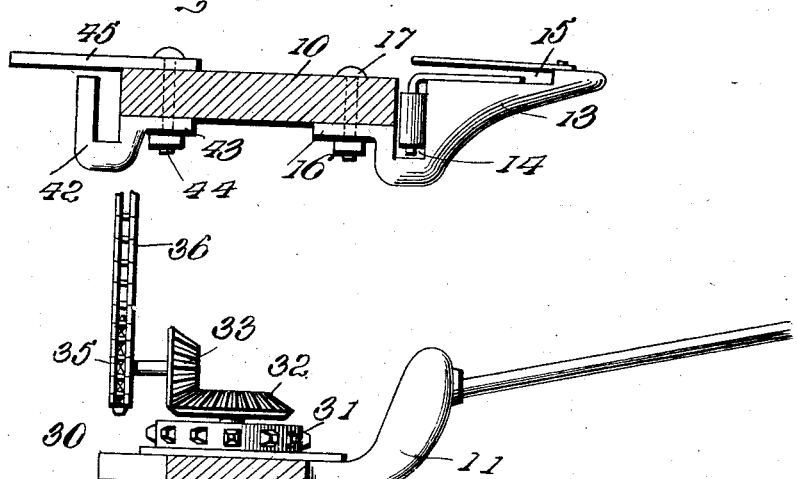
Witnesses
Inventor
P. J. Harms
By

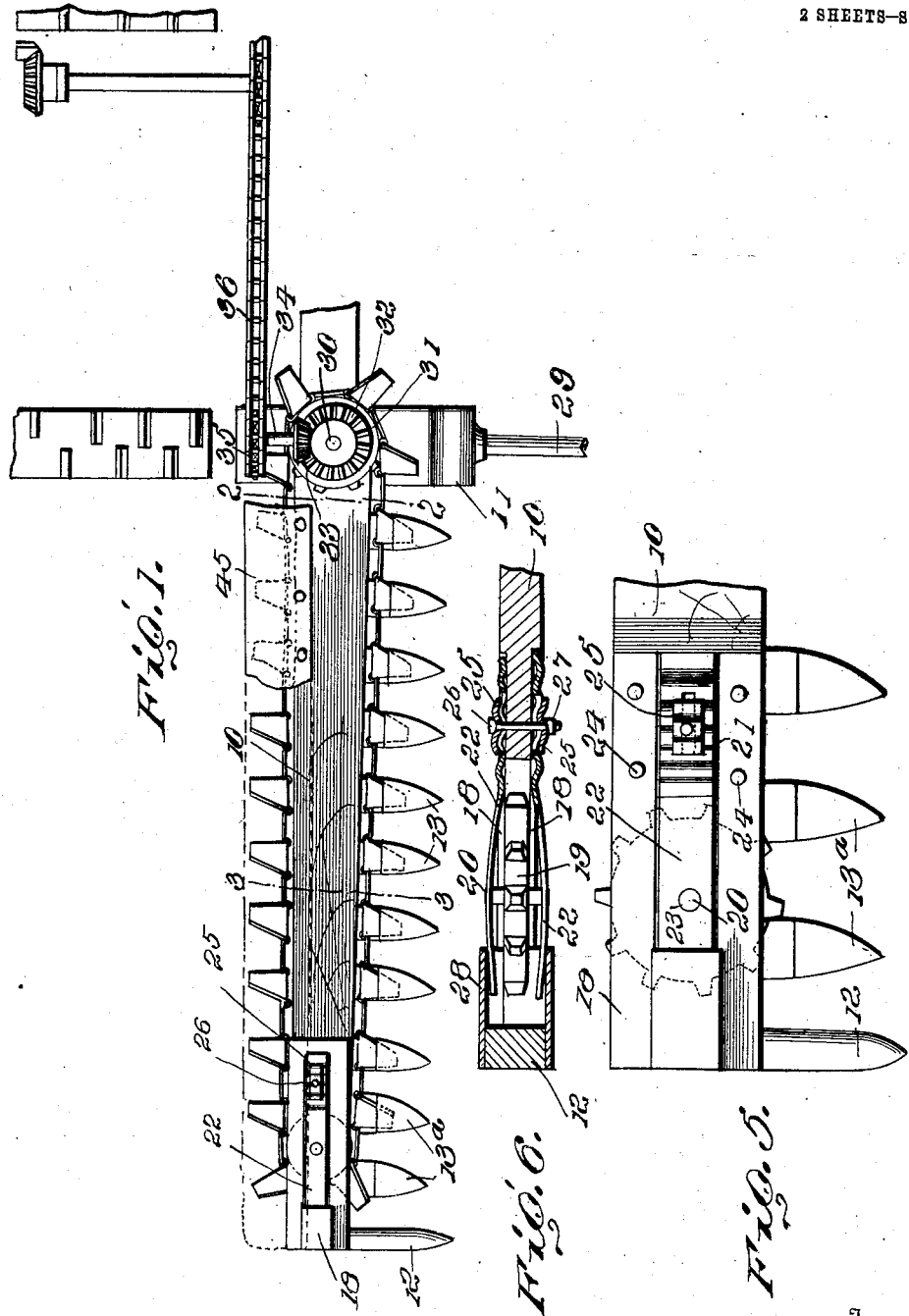

UNITED STATES PATENT OFFICE.

PETER J. HARMS, OF CHATTANOOGA, OKLAHOMA.

ENDLESS SICKLE.

992,656.  Specification of Letters Patent.  Patented May 16, 1911.

Application filed June 14, 1910. Serial No. 566,881.

*To all whom it may concern:*

Be it known that I, PETER J. HARMS, citizen of the United States, residing at Chattanooga, in the county of Comanche and State of Oklahoma, have invented certain new and useful Improvements in Endless Sickles, of which the following is a specification.

This invention relates to mowing machines and the like, and refers particularly to an improved sickle bar for attachment to such machines.

An object of this invention is to so form a sickle bar that a steady, even draft is effected relative to the mowing machine, and in which the pounding and consequent wear of the reciprocating cutter bar is overcome.

The invention further provides an improved sickle bar having an endless chain or belt to carry the knives, and which constitutes the cutter bar, and to provide the machine with a tension device for yieldingly holding the endless belt or chain taut so as to provide rigid blades upon the sickle bar.

The invention still further comprehends a peculiar form of chain or belt which carries integral blades, and which is of such construction that the blades may be detached from the chain by simply removing the links thereof.

For a full understanding of the invention reference is to be had to the following description and accompanying drawings, in which:—

Figure 1 is a top plan view of the improved sickle bar disclosing a portion of a mowing machine to which the sickle bar is applied. Fig. 2 is a transverse section through the sickle bar on the line 2—2 of Fig. 1. Fig. 3 is an enlarged transverse section of the sickle bar on the line 3—3 of Fig. 1. Fig. 4 is a detail perspective view of a portion of the endless belt or chain. Fig. 5 is a detail disclosing a top plan view of the outer end of the sickle bar. Fig. 6 is a longitudinal section through the same.

Corresponding and like parts are referred to in the following description and indicated in all the views of the accompanying drawings by the same reference characters.

The improved sickle bar is formed of a finger bar 10 which is provided at its opposite ends with the inner or large shoe 11 and the outer or reduced shoe 12. The finger-bar 10 carries a plurality of spaced fingers 13, formed at their inner ends with upwardly opening pockets 14 to receive the improved endless belt or chain. The pockets 14 are vertically arranged in the fingers 13, the forward edge of the finger-bar 10 forming the inside wall of each of the pockets. The outside wall of each of the pockets terminates in a horizontal slot 15 formed in the upper portion of the finger 13 in the usual manner. The fingers 13 are provided with rearwardly extending flanges 16 which seat against the under face of the finger-bar 10 and are held rigidly in such position by clamping bolts 17. The outer end of the finger-bar 10 is provided with a pair of plates 18, arranged against the opposite sides thereof and extending beyond the extremity of the same to support the outer shoe 12. A sprocket wheel 19 is disposed between the plates 18 and mounted upon a pin 20 extending oppositely from the wheel 19 and into longitudinal slots 21 formed centrally and in registered relation within the plates 18. Adjusting arms 22 are arranged within the slots 21 and have registering openings 23 to snugly receive the ends of the pin 20. The inner ends of the arms 22 rest in the countersunk sides of the bar 10, and are held rigidly in such position by bolts 24, or the like. The slots 21 extend into the inner ends of the plates 18 to admit of the inner ends of the arms 22 resting against the sides of the finger-bar 10. The inner ends of the arms 22 are transversely crimped to provide corrugated outer faces to receive correspondingly formed clamping plates 25 carried upon the opposite ends of a clamping bolt 26. The clamping bolt 26 passes through the outer end of the finger-bar 10 and carries upon its lower end a clamping nut 27 engaging against the outer face of the lower clamping plate 25. The outer ends of the plates 18 are offset outwardly to form guides 28 to receive the outer ends of the arms 22 and to hold the same within the slots 21.

The inside or large shoe 11 is provided in the usual manner with a supporting arm 29 which admits of the adjustment of the finger-bar 10. A vertical shaft 30 is carried upon the shoe 11 and extends upwardly therefrom to support a sprocket-wheel 31 which is keyed thereto and arranged in the horizontal plane of the sprocket-wheel 19. A beveled gear 32 is fixed upon the upper end of the shaft 30 and meshes with a correspondingly beveled pinion 33 arranged upon the inner extremity of a horizontal shaft 34. The shaft 34 is carried at the rear end of the shoe 11 and is provided with a sprocket wheel 35 upon its rear end. A suitable chain 36 passes over the sprocket wheel 35 to impart movement thereto.

The improved endless belt or cutter which is employed in connection with the device comprises a plurality of open links 38 which are spaced apart by the provision of connecting strips 39. The connecting strips 39 are formed from strips of metal having overturned ends engaging about the extremities of the links 38 in order to hingedly connect the same. The openings in the links 38 receive the teeth of the sprockets 19 and 31 during the operation of the belt.

Each of the links 38 is provided with a cutter blade 40. The blade 40 is integrally formed upon the upper edge of the link 38 and is provided with an oblique or beveled cutting edge 41 facing in the direction in which the belt travels. The links 38 are of sufficient width to dispose the blades 40 in the slots 15 when the links pass through the vertical pockets 14. The endless cutter is supported across the rear edge of the finger-bar 10 by a plurality of spaced guards 42. The guards 42 are of substantially U-form, the inner arms of which are turned outwardly as at 43 to seat against the under side of the finger-bar 10 and secure it in such position by bolts 44. The bolts 44 pass downwardly through the finger-bar which projects rearwardly in spaced relation over the guards 42.

As the mower is drawn over the field the traction wheels revolve and actuate the chain 36. This movement of the chains 36 is communicated to the intermeshing beveled gears 32 and 33 to the vertical shaft 30. The sprocket wheel 31 is thereby set in motion and caused to revolve and to draw the forward side of the chain toward the inside or large shoe 11. This movement carries the blades 40 through the slots 15 formed in the fingers 13 and produces the cutting of the herbage by the movement of the blades in one direction. The blades 40 pass around the sprocket 31 and travel across the rear edge of the finger-bar 10 beneath the guard-plate 45 and over the outer sprocket 19, when they again travel through the fingers 13.

When it is desired to adjust the tension of the endless belt, the clamping bolt 26 is loosened and the plates 25 are separated from the inner corrugated ends of the arms 22. The inner ends of the arms 22 are slotted to admit of the longitudinal adjustment thereof with the clamping bolt 26 to increase or decrease the tension of the endless belt. The guides 28 loosely receive the outer ends of the arms 22 and retain the same in registered relation against the opposite sides of the sprocket wheel 19. It will be noted that the outer fingers 13ª are carried upon the forward edges of the plates 18 and forwardly of the sprocket wheel 19.

Having thus described the invention, what is claimed as new is:

1. A sickle-bar including a finger-bar, an endless cutter carried upon the finger-bar, spaced companion plates carried at the end of the finger-bar and being longitudinally slotted and offset outwardly to provide guides at the ends of the slots, transversely corrugated spring-arms carried against the opposite sides of the finger-bar and in the slots and extending into the guides, a sprocket-wheel journaled between the spring-arms for supporting the endless cutter, corrugated clamping plates engaging against the spring arms, and clamping bolts engaging through the plates and the arms to bind the same against the opposite sides of the finger-bar.

2. A sickle-bar including a finger-bar, an endless cutter carried by the finger-bar and disposed against the opposite edges thereof, companion-plates projecting from the end of the finger-bar upon opposite sides thereof and having longitudinal slots therein, the outer ends of the companion-plates being offset outwardly to provide guides at the ends of the slots, spring-arms engaging against the opposite sides of the finger-bar at their inner ends and projecting into the guides, the inner ends of the spring-arms being transversely corrugated, clamping-plates engaging against the outer faces of the corrugated portions of the spring-arms and being transversely crimped to interfit with the corrugations of the arms, a clamping bolt engaging through the clamping plates and the arms for attaching the same to the finger-bar, and a sprocket journaled between the spring-arms for supporting the endless cutter.

In testimony whereof, I affix my signature in presence of two witnesses.

PETER J. HARMS. [L. S.]

Witnesses:
DON CARLOS WELCH,
W. J. SHAFFEL.